United States Patent [19]

Claussen et al.

[11] Patent Number: 4,562,863
[45] Date of Patent: Jan. 7, 1986

[54] LIQUID FLOW INDICATOR FOR FARM IMPLEMENTS

[76] Inventors: Robert L. Claussen, 3049 Utah Ave. North, Crystal, Minn. 55427; Steven W. Claussen, 1720 Nevada Ave., Benson, Minn. 56215

[21] Appl. No.: 574,395

[22] Filed: Jan. 27, 1984

[51] Int. Cl.⁴ .................... F16K 37/00; B67D 5/38
[52] U.S. Cl. .................... 137/559; 73/861.55; 73/861.58; 137/557; 239/74
[58] Field of Search ............. 137/861.55, 861.58, 137/559, 552, 557, 561 R, 561 A; 239/74

[56] References Cited

U.S. PATENT DOCUMENTS

| | | | |
|---|---|---|---|
| 1,911,351 | 5/1933 | Cole | 73/861.58 |
| 2,130,981 | 9/1938 | Fischer et al. | 73/861.55 |
| 2,993,374 | 7/1961 | Dwyer et al. | 73/861.55 |
| 3,416,371 | 4/1966 | Locke | 73/209 |
| 3,633,421 | 1/1972 | Phillips | 73/209 |
| 3,974,857 | 8/1976 | Hehl | 137/559 |
| 4,317,376 | 3/1982 | Fitzpatrick | 73/861.55 |

FOREIGN PATENT DOCUMENTS 138357 11/1901 Fed. Rep. of Germany ... 73/861.55

Primary Examiner—A. Michael Chambers
Attorney, Agent, or Firm—William L. Huebsch

[57] ABSTRACT

A flow indicator that can visually indicate to an implement operator whether or not there is an equal flow rate of liquids through multiple liquid outlet lines on the implement. The flow indicator includes wall portions defining a manifold adapted to be connected in the system to receive liquid output from a pump, and transparent generally parallel closely spaced tubular members having similarly sized through openings communicating with the manifold, increasing in diameter from their inlet ends, and having outlet ends coupled to the outlet lines. Normally, liquid is pumped into the manifold and flows out the tubular members with equal flow rates so that similarly sized indicating members visible in the tubular members will be horizontally aligned. If the operator observes one indicating member out of alignment, this will indicate that one of the outlet lines is obstructed and in need of attention.

11 Claims, 4 Drawing Figures

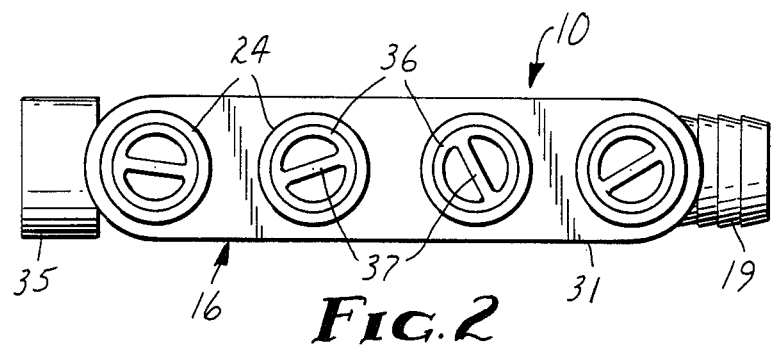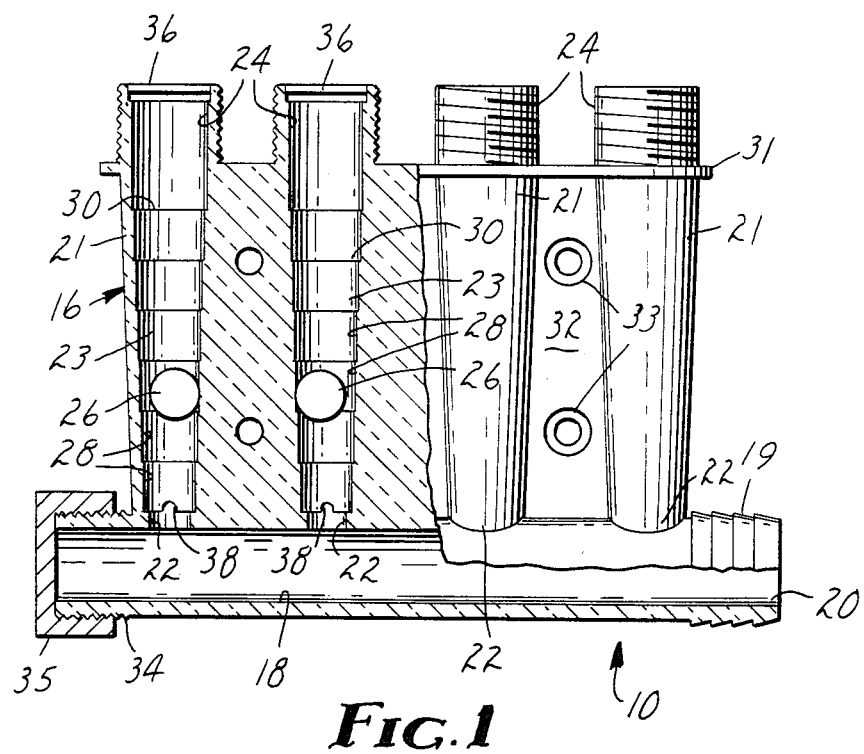

4,562,863

LIQUID FLOW INDICATOR FOR FARM IMPLEMENTS

TECHNICAL FIELD

This invention relates to devices for indicating flows through delivery systems on farm implements.

BACKGROUND ART

Various devices are known for indicating flows through delivery systems on farm implements. While such systems may, with varying accuracy, indicate flow rates through delivery systems, they are generally very complex and expensive, and often require complex electronic sensing and indicating means.

DISCLOSURE OF THE INVENTION

The present invention provides a simple effective flow indicator that can visually indicate to an implement operator whether or not there is an equal flow of liquids being pumped through multiple liquid outlet lines on the implement, which flow indicator is particularly useful in liquid delivery systems for liquid fertilizers, insecticides, herbicides, fungicides, or the like.

The flow indicator according to the present invention comprises first wall means defining a manifold adapted to be connected in the system for receiving liquid output from the pump, and transparent wall means defining a plurality of generally parallel closely spaced tubular members having inlet ends communicating with the manifold. The tubular members have similarly sized through openings that increase in diameter in the same predetermined pattern from their inlet ends, and have outlet ends adapted to be coupled to the outlet lines so that, normally, pumped liquid flows into the manifold and out the tubular members with an equal flow rate through each of the tubular members and its associated outlet line. A similarly sized indicating members is positioned in each of the tubular members so that, with the tubular members vertically disposed and their outlet ends uppermost, equal flow rates through the tubular members and outlet lines will cause the indicating members to be horizontally aligned in the tubular members and to be visible to the implement operator. If the operator observes one indicating member out of alignment, this will indicate unequal flow rates through the tubular members and that one of the outlet lines is obstructed and in need of attention.

Preferably the first wall means defining the manifold and the tubular members are incorporated in a unitary molding of transparent nylon or other suitable polymeric material which is not chemically attacked by most fertilizers, herbicides, insecticides, or other chemicals normally used in such systems.

Also, preferably the through openings in the tubular members are defined by adjacent cylindrical inner wall surfaces, which cylindrical wall surfaces have steps therebetween and increase in diameter from the inlet ends toward the outlet ends of the tube members. With this configuration, the indicating members will each be positioned at one of the steps between the cylindrical portions, which will place the indicating members more precisely in alignment when there are equal rates of liquid flow through the tubular members. Also, with such steps, apparently turbulence at the steps causes the indicating members to circle the inside of the tubular members at the steps so that they can be easily seen through the transparent tubular members, even if the liquid flowing through the tubular members is quite opaque.

BRIEF DESCRIPTION OF THE DRAWING

The invention will be further described with reference to the accompanying drawing wherein like reference numerals refer to like parts in the several views and wherein:

FIG. 1 shows a liquid flow indicator according to the present invention having parts broken away to show details;

FIG. 2 is a top view of the liquid flow indicator of FIG. 1;

DESCRIPTION OF THE PREFERRED EMBODIMENT

Figure 4:
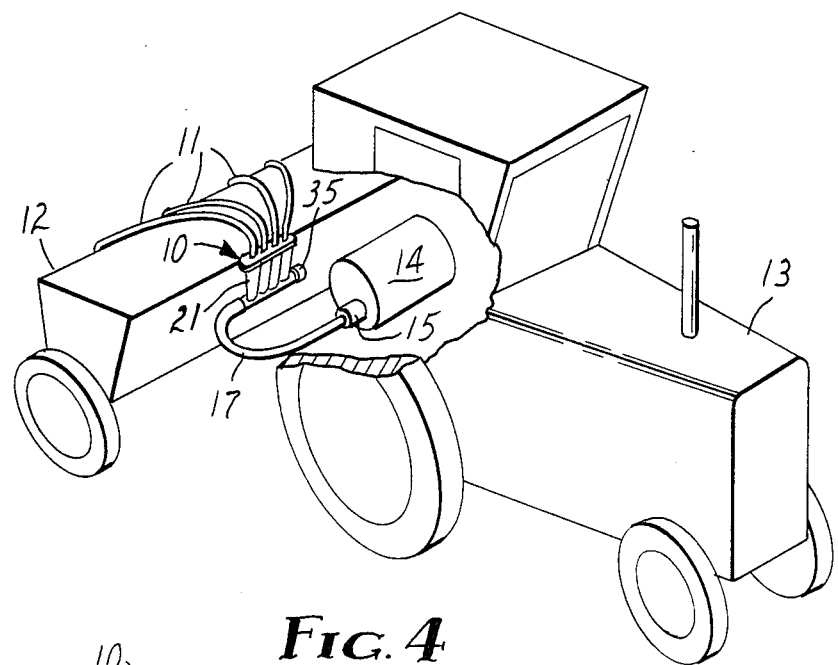
FIG. 4 is a perspective view showing the liquid flow indicator according to the present invention installed on a farm implement.

Referring now to the drawing there is shown in FIG. 4 a liquid flow indicator according to the present invention generally designated by the reference numeral 10. The flow indicator 10 is shown mounted on a farm implement or planter 12 being pulled by a tractor 13 (however the flow indicator is equally useful on self-propelled implements) and is included in a delivery system for liquid fertilizers, herbicides, insecticides, or the like. The delivery system as illustrated, comprises a pump 15 powered by the tractor 13 to pump liquid from a supply tank 14 through a hose 17 coupled between the pump 15 and the flow indicator 10, and through the flow indicator 10 and a plurality (illustrated as four) outlet lines 11 coupled thereto to discharge points at the ground.

As is best seen in FIGS. 1 and 2, the flow indicator 10 comprises an integral polymeric molding 16 including a first generally cylindrical wall portion defining a manifold 18 adapted to be connected by a hose barb 19 around an inlet opening 20 in the manifold 18 to the hose 17 which conveys liquid output from the pump 15. The molding 16 also includes transparent wall portions defining a plurality of generally parallel closely spaced vertically disposed tubular members 21 having inlet ends 22 coupled to the cylindrical wall portion defining the manifold 18, having uppermost outlet ends 24 with external threads adapted for engagement by connectors on the outlet lines 11, and having similarly sized through openings 23 communicating with the manifold 18 and increasing in diameter in a predetermined pattern from the inlet end 22 toward the outlet end 24 of the tubular members 21. A brightly colored similarly sized spherical indicating member 26 (e.g., of the polymeric material with a specific density of about 1.4 commercially designated "Delrin" and sold by E. I. duPont de Nemours and Co., Wilmington, Del.) is positioned in each of the through openings 23 in the tubular members 21 and will be buoyed upwardly by liquid flowing through the tubular member 21. Equal flow rates through the tubular members 21 and outlet lines 11 will produce horizontally aligned indicating members 26 visible by the operator of the tractor 13, and one of the indicating members 26 out of alignment will indicate unequal flow rates through the outlet lines 11 to the operator.

Preferably, as illustrated, the through opening 23 in each of the tubular members 21 is defined by a series of stepped cylindrical wall surfaces 28 increasing in diameter from the inlet end 22 toward the outlet end 24 of the tubular member 21. The series of stepped cylindrical wall surfaces 28 in the tubular members 21 are identical so that for equal flow rates through the tubular members 21 and outlet lines 11, the indicating members 26 will be positioned in horizontal alignment at the steps 30 between the cylindrical wall surfaces 28 of the same sizes. This location at the steps 30 will place the indicating members 26 more precisely in horizontal alignment when there are about equal rates of liquid flow through the tubular members 21 than would be the case if the openings through the tubular members 21 were conical. Also, with such steps 30, apparently turbulence at the steps 30 causes the indicating members 26 to circle the inside of the tubular members 21 at the steps 30 where they can be easily seen through the transparent tubular members 21, even if the liquid flowing through the tubular members 21 is quite opaque.

Figure 3:
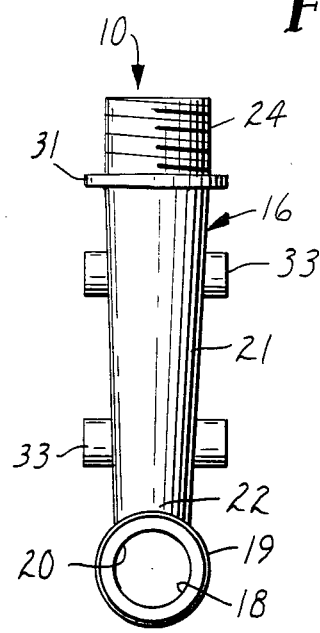
FIG. 3 is an end view of the liquid flow indicator of FIG. 1.

The integral molding 16 including the wall portions defining the manifold 18 and the tubular members 21 is best seen in FIGS. 1, 2 and 3. The molding 16 is preferably of transparent nylon (such as the material sold under the trademark name "Zytel 330" by Dupont) which has good resistance to chemical attack by most chemicals expected to be used in the flow indicator 10. In addition to the wall portion defining the manifold 18 and the tubular members 21, the molding 16 further includes webbing wall portions that provide rigidity for the molding 16, including a first webbing wall portion 31 transverse to the tubular members 21 adjacent their outlet ends 24, and a second webbing wall portion 32 axially aligned with and bridging between the tubular members 21 and the wall portion defining the manifold 18. Four cylindrical collars 33 project from each side of the second webbing wall portion 32 and are aligned in pairs to define four through openings adapted to receive fasteners such as bolts to fasten the indicator 10 in place on the implement 12. Additionally the wall portion defining the manifold 18 defines a through opening and has threads 34 around its periphery at its end opposite the hose barb 19. The threads 34 are engaged by a hose cap 35 to close the end of the manifold 18 opposite the hose barb 19. The through opening defined by that wall portion facilitates making and cleaning of the molding 16, and affords connecting two or more of the moldings 16 together to provide an expanded flow indicator for a system having more than 4 outlet lines.

Preferably a circular disk-like grate 36 having two through passageways separated by a transverse bar 37 (FIG. 2) is engaged in a circular groove around the through opening 23 at the outlet end 24 of each tubular member 21 to prevent escape of the indicating member 26 from that tubular member 21, such as into the connected outlet line 11. Also, the tubular members 21 have drain notches 38 through their stepped wall surfaces 28 adjacent the manifold 18, which drain notches 38 insure that liquid in the tubular members 21 can drain back into the manifold 18 around the cylindrical indicating members 26 after flow through the indicator 10 is discontinued.

As a non-limiting example, a manifold 18 with a 0.75 inch (1.9 cm.) inside diameter connected to tubular members 21 each having seven coaxial stepped cylindrical wall surfaces 28 which cylindrical wall surfaces 28 each have an axial length of 0.5 inch (1.27 cm.), the first six of which wall surfaces 28 increase in diameter in 0.03 inch (0.76 cm.) increments from 0.56 to 0.71 inch (1.42 to 1.80 cm.), have been found to provide good flow indication and to handle normal flow rates for most typical uses when an 0.5 inch (1.27 cm.) diameter spherical indicating member 26 having a density of about 1.4 is used.

The present invention has now been explained with reference to one embodiment. It will be evident to those skilled in the art that many modifications could be made to the present invention without departing from the spirit of the invention. Thus the scope of the present invention should not be limited by the structure described with reference to the preferred embodiment, but only by the structure described by the claims and their equivalents.

We claim:

1. A flow indicator for use in a multi-outlet line, pump pressurized, liquid delivery system for liquid fertilizers, herbicides, insecticides, or the like, on an implement, said flow indicator comprising a unitary molding including first wall means defining a manifold having a straight central axis adapted to be connected in said system for receiving liquid output from said pump, transparent wall means defining a plurality of generally parallel closely spaced tubular members having inlet ends coupled to said first wall means, similarly sized through openings communicating with said manifold and increasing in diameter in a predetermined pattern from said inlet end, and having outlet ends adapted to be coupled to said outlet lines, said tubular members each having a straight central axis intersecting said manifold and disposed at about a right angle to the axis of said manifold and webbing wall means bridging said tubular members for providing rigidity for the molding; and a similarly sized indicating member in the through opening of each of said tubular members so that with said tubular members generally vertically disposed with said outlet ends uppermost, equal flow rates through said tubular members will produce visible horizontally aligned indicating members, and one of the float members out of alignment will indicate unequal flow rates through the tubular members and thus the outlet lines.

2. A flow indicator according to claim 1, wherein said through openings are each defined by stepped cylindrical wall surfaces increasing in diameter from said inlet end toward said outlet end so that for equal flow rates through said tubular members, said indicating members will be positioned at the steps between cylindrical wall surfaces of the same sizes in all of the tubular members and will circle the inside of the tubular members so that they can be easily seen through the tubular members even if liquid flowing through the tubular members is quite opaque.

3. A flow indicator according to claim 1 wherein said unitary molding is of transparent nylon.

4. A flow indicator according to claim 1 wherein said webbing wall means that provide rigidity for the molding includes a first webbing wall portion transverse to said tubular members adjacent their outlet ends, and a second webbing wall portion axially aligned with and bridging between said tubular members and said first wall portion defining the manifold.

5. A flow indicator according to claim 1 wherein said first wall means defining said manifold has a through opening with one end around said through opening adapted to be connected to said system and an opposite end around said through opening, and said flow indicator includes closing means for closing said opposite end, said closing means being removable to afford cleaning said manifold and through openings, and to afford attaching another similar unitary molding to expand the size of said flow indicator.

6. In combination, a farm implement, and a liquid delivery system for liquid fertilizers, herbicides, insecticides, or the like, mounted on said implement, said liquid delivery system comprising a pump having an outlet mounted on and operably coupled to be driven by said implement, a first hose having an outlet end and having an inlet end coupled to the outlet of said pump, a plurality of outlet lines each having an inlet and an outlet end, and a flow indicator coupled between the outlet end of said first hose and the inlet ends of said outlet lines, said flow indicator comprising a unitary molding including first wall means defining a manifold connected in said system for receiving liquid outlet from said pump, transparent wall means defining a plurality of generally parallel closely spaced vertically disposed tubular members having inlet ends coupled to said first wall means, similarly sized through openings communicating with said manifold and increasing in diameter in a predetermined pattern from said inlet end, and having uppermost outlet ends coupled to the inlet ends of said outlet lines and webbing wall means bridging said tubular members for providing rigidity for the molding; and a sililarly sized indicating member in each of said tubular members so that equal flow rates through said tubular members will produce horizontally aligned indicating members visible to an operator of the implement, and one of the indicating members out of alignment will indicate unequal flow rates through said outlet lines.

7. A combination according to claim 6 wherein said through openings are each defined by stepped cylindrical wall surfaces increasing in diameter from said inlet end toward said outlet end so that for equal flow rates through said outlet lines, said indicating members will be positioned at the steps between cylindrical wall surfaces of the same sizes in all of the tubular members, and will circle the inside of the tubular members to that they can be easily seen through the tubular members even if liquid flowing through the tubular members is quite opaque.

8. A combination according to claim 6 wherein said unitary molding is of transparent nylon.

9. A combination according to claim 6 wherein said webbing wall means that provide rigidity for the molding includes a first webbing wall portion transverse to said tubular members adjacent their outlet ends, and a second webbing wall portion axially aligned with an bridging between said tubular members and said wall portion defining the manifold.

10. A combination according to claim 6 wherein said first wall means defining said manifold has a through opening with one end around said through opening connected to said system and an opposite end around said through opening, and said flow indicator includes closing means for closing said opposite end, said closing means being removable to afford cleaning said manifold and through openings, and to afford attaching another similar unitary molding to expand the size of said flow indicator.

11. A flow indicator for use in a multi-outlet line, pump pressurized, liquid delivery system for liquid fertilizers, herbicides, insecticides, or the like, on an implement, said flow indicator comprising a unitary molding of transparent nylon including first wall means defining a manifold adapted to be connected in said system for receiving liquid output from said pump, transparent wall means defining a plurality of generally parallel closely spaced tubular members having inlet ends coupled to said first wall means, similarly sized thorugh openings communicating with said manifold and increasing in diameter in a predetermined pattern from said inlet end, and having outlet ends adapted to be coupled to said outlet lines and webbing wall means bridging said tubular members for providing rigidity for the molding and a similarly sized indicating member in the through opening of each of said tubular members so that with said tubular members generally vertically disposed with said outlet ends uppermost, equal flow rates through said tubular members will produce visible horizontally aligned indicating members, and one of the float members out of alignment will indicate unequal flow rates through the tubular members and thus the outlet lines.

* * * * *